United States Patent [19]

Huguenin et al.

[11] Patent Number: 4,901,084
[45] Date of Patent: Feb. 13, 1990

[54] OBJECT DETECTION AND LOCATION SYSTEM

[75] Inventors: Richard G. Huguenin, South Deerfield; Paul F. Goldsmith, Leverett; Naresh C. Deo, Conway; David K. Walker, Northfield, all of Mass.

[73] Assignee: Millitech Corporation, South Deerfield, Mass.

[21] Appl. No.: 183,215

[22] Filed: Apr. 19, 1988

[51] Int. Cl.$^4$ .................... G01S 13/89; H01L 27/14
[52] U.S. Cl. ................................. 342/179; 342/107; 250/332
[58] Field of Search .................. 250/330, 332, 334

[56] References Cited

U.S. PATENT DOCUMENTS

| | | | |
|---|---|---|---|
| 3,746,454 | 7/1973 | Pace et al. | 250/332 X |
| 4,164,740 | 8/1979 | Constant | 342/179 |
| 4,611,912 | 9/1986 | Falk et al. | 356/28.5 X |

OTHER PUBLICATIONS

Skolnik, Introduction to Radar Systems (1980), pp. 81–84.
Goldsmith, P. F., "Designing Quasioptical Systems" (5th Edition), Microwave System Designers Handbook (1987).
Yngvesson, "Imaging Front-End Systems for Millimeter Waves on Submillimeter Waves", SPIE Conf. on Submillimeter Spectroscopy, (1985).
Yngvesson, "Near Millimeter Imaging with Integrated Planar Receptors: General Requirements and Constraints", Infrared and Millimeter Waves, 10, pp. 91–110 (1983).
Korzeniowski et al., "Imaging System at 946HZ Using Tuperev Slot Antennu Elements", Eighth IEEE Int'l. Conference on Infrared and Millimeter Waves (1983).
Yngvesson et al., "Millimeter Wave Imaging System with an Endfire Receptor Array" Tenth Int'l. Conf. On Infrared and Millimeter Waves (1981).
Singh et al., "Integrated 946HZ Transceiver with InP Gunn Diode Local Oscillator", Government Microelectronics and Circuits Conference (1986), pp. 295–297.

Primary Examiner—Thomas H. Tarcza
Assistant Examiner—Gilberto Barrón, Jr.
Attorney, Agent, or Firm—Pennie & Edmonds

[57] ABSTRACT

A millimeter wave object detection and location system is disclosed comprising a source generating a millimeter wave signal which is divided into an illumination beam, directed onto a field of view, and a local oscillator portion, mixed with radiation reflected from objects in the field of view. The mixing is performed in a staring array of mixer/detector elements which need not be mechanically or electronically scanned to generate signals responsive to the entire field of view. The detected signal from each element is directly responsive to a portion of the field of view. The oscillator signal is preferably linearly polarized, and a polarizing grid is used to separate the local oscillator signal and illumination beam and direct them in a simple and efficient manner. A twist reflector may also be used to rotate the polarization of a portion of the beam to direct it onto the mixer/detector array for mixing with the received signal from the field of view.

Improved constructions of millimeter wave source and mixer/detector elements are also disclosed, which greatly simplify construction of the device.

64 Claims, 4 Drawing Sheets

OBJECT DETECTION AND LOCATION SYSTEM

FIELD OF THE INVENTION

This invention relates to apparatus and methods for millimeter wave object detection, location, and ranging. More particularly, the invention relates to a millimeter wave object detection and location system in which a reflected illumination signal is detected by an array of millimeter wave radiation responsive detectors, such that mechanical or electronic scanning of a transmitting array is avoided.

BACKGROUND OF THE INVENTION

Generation of signals responsive to millimeter wave radiation (radiation having wavelengths in approximately the 1 cm-1 mm range, that is, of between approximately 30 and 300 GHz frequency) reflected from objects in a field of view is desired in many applications. This is largely because millimeter waves are not as completely attenuated by moisture in the air, as are, for example, visible and infrared radiation. For example, the fact that visible light is very thoroughly attenuated by fog currently prevents aircraft from landing and taking off in fog, which obviously is highly inconvenient to travellers. Millimeter waves also penetrate other adverse enviornments such as smoke, clouds of chemical gas, dust and the like wherein the particles are of less than millimeter size.

A further advantage of millimeter waves, particularly with respect to microwaves, is that many of the components, notably antennas, can be made much smaller due to the shorter wavelength of the radiation. Accordingly, it would be desirable to use millimeter waves in various applications where smaller antennas are needed, for example, in aircraft applications, or in other mobile, marine or space applications.

There are several reasons why practical millimeter wave object detection and location systems are not now available. One is that to generate an image using a millimeter-wave sensor has been thought to require either mechanical or electronic scanning of the sensor with respect to the field of view. Mechanical scanning devices in which a sensor is physically moved through a range of azimuths, elevations or both, defining a field of view, are complex and subject to failure. Electronic scanning is also complex and at millimeter-wave frequencies requires employment of electronic phase shifting or switching techniques, which are relatively complex to implement.

More specifically, electronic scanning systems proposed to date have involved aperture-plane arrays, that is, arrays of radiation sources, which emit radiation which varies in pahse from one emitter to the next. Such "phased-array" systems are described in *Introduction to Radar Systems*, Skolnik (1980), especially in chaper 8, pp. 278–342. Broadly, the signal transmitted by each of the sources travels outwardly in a different direction; a single detector element detects radiation reflected from objects in the field of view, and the phase of the detected radiation is used to determine the azimuth and elevation of the reflecting object.

Such phased-array systems are complex by their nature; the complexity would only be compounded by the high frequencies inherent in millimeter-wave systems.

One conventional method of reducing the frequency of a received signal to a lower frequency for convenience in signal processing is to mix the received signal with a local oscillator signal of generally similar frequency. As is well known, this "mixing" results in sum and difference signals. The difference signal is reduced in frequency, such that it can be processed using more conventional electronic circuitry and techniques.

Normally a millimeter-wave local oscillator signal must be combined with the received signal using waveguide or transmission line technology; while not infeasible, this requirement has limited millimeter-wave receivers to a single imaging element, which therefore must be scanned either mechanically or electronically as described above to generate an image of an field of view. As noted, either scanning technique introduces substantial complexity to an imaging system.

Skolnik, op. cit., page 82, teaches that mixing of local oscillator and transmitted radar signals can be performed in a non-linear circuit element such as a diode. Skolnik also suggests at p. 561 the specific application of such techniques, employing Schottoy-carrier diodes, to millimeter-wave systems. However, the present inventors are aware of no suggestion in the art that it would be useful or possible to fabricate a multiple-element array using this technique.

References are known which suggest that a focal plane array of antenna elements responsive to millimeter wave radiation can be constructed. See Gillespie et al., "Array Detectors for Millimeter Line Astronomy" *Astron. Astrophys*, 73, 14–18 (1979). This reference shows an array of elements for detection of millimeter wave radiation, in which a local oscillator signal is introduced from a central feed area of a primary mirror of a Cassegrain telescope. As acknowledged by Gillespie et al., this would lead to serious difficulties with uniformity of the local oscillator signal over the array. Furthermore, Gillespie et al. only teaches a single element detector, that is, Gillespie et al. does not teach a multiple-element array in which each pixel of the image corresponds one of the detectors.

Other references show systems in which the elements of the focal plane array are intended to map to elements of the ultimate image. See, for example, Yngvesson et al. "Millimeter Wave Imaging System With An Endfire Receptor Array", 10*th International Conference on Infrared and Millimeter Waves* (1985). Other references of comparable disclosure are also known. This document suggests a multiple element focal plane array wherein each element includes a diode connected across spaced antenna members for rectification of received millimeter-wave energy and superheterodyne signal detection. Yngvesson et al. shows slots extending transverse to the slot between the spaced antenna members of each element of the array for low-pass filtering purposes. However, the Yngvesson et al. reference teaches only Cassegrain or other reflector telescope designs, in which the local oscillator signal is injected through an aperture in the reflector. Such arrangements would involve the same difficulties with respect of uniformity of illumination as in the Gillespie et al. reference. Furthermore, such Cassegrain-telephone arrangements are not optimal for many desired applications of millimeter wave detection technology; they are bulky, difficult to fabricate and sensitive to physical mishandling. A more compact, more rugged and less complex design is clearly required by the art.

The Jan., 1988 issue of *Popular Science* magazine reports (on page 65) that multiple element "rectennas" employing diodes to rectify microwave energy for power purposes have been successfully tested. A NASA report by Brown, "Design Definition Of A Microwave Power Reception and Conversion System For Use In A High Altitude Powered Platform", NTIS Report No. N81-27401, (1983) details the "rectenna" structure. However, these documents fail to suggest that a multiple element array responsive to millimeter-wave energy might be useful or feasible for image formation.

Generally speaking, in any radar system, it is necessary to transmit time-varying energy into the field of view to illuminate it, so that object direction and velocity information can be derived from the reflected signal. The prior art does not suggest a method for construction of a sufficiently powerful millimeter-wave oscillator to provide an adequately powerful signal; present day solid state sources such as Gunn diode oscillators and the like are limited in their millimeter wave power output.

SUMMARY OF THE INVENTION

Accordingly, it is an object of the invention to provide a millimeter wave object detection and location system, that is, a radar system, which does not employ mechanical or electronic scanning in order to generate an image of objects in a field of view.

It is a further object of the invention to provide a millimeter wave radar system which does not require waveguide or other transmission line techniques to combine a local oscillator signal with a received signal.

It is a further object of the invention to provide a millimeter wave radar system in which a single radiation source is used both to illuminate the field of view with millimeter wave radiation and to provide a local oscillator signal for mixing with the received reflected signal, substantially simplifying the construction of the system as compared to a system in which separate illumination and local oscillator sources are used.

It is a further object of the invention to provide a millimeter wave radar system in which an array of oscillating elements is used to generate illumination and local oscillator signals, and a much larger number of mixer/detector elements in a second array are used to detect signals corresponding to reflecting objects in the field of view.

The above objects of the invention and others which will appear as the discussion proceeds are satisfied by the present invention, which comprises a multiple-element source of millimeter-wave energy, a major portion of which is simply directed onto the field of view, and a minor portion of which is directed onto a detector array as a local oscillator signal. The detector array is a "staring", that is, unscanned, millimeter wave sensor, in which each element provides a signal corresponding to a particular picture element or "pixel".

More particularly, according to the invention, linearly-polarized radiation from a local oscillator source comprising a plurality of Gunn diodes or other oscillators, each continuously emitting time-varying millimeter-wave energy, is directed onto a polarization grid in the optical path between a multiple lement mixer/detector array and the field of view. The optical path need not be collinear. The grid divides the energy into major and minor portions. A minor portion of the energy is reflected onto the mixer/detector array, and becomes a local oscillator signal. The major portion is directed into the field of view as the illumination signal. Millimeter wave radiation reflected from objects in the field of view passes through a lens, an optional high pass filter and the polarization grid and is combined by each of the mixer/detector elements of the array with the local oscillator signal.

It is a further object of the invention to provide a millimeter wave detector array which does not involve a Cassegrain-telescope optical system, and in which injection of a local oscillator signal into each of the elements of the detector array does not require an aperture in a focussing element.

In this way, no waveguide or other complex transmission line technologies are required to combine the local oscillator signal and the signal from the field of view. The mixers may each comprise a Schottky barrier diode or other nonlinear device formed directly across planar conductors comprising the antenna elements of each of the mixer/detector elements of the array. After mixing in the nonlinear devices, the difference signal, now at an intermediate frequency, can be processed conventionally, e.g., amplified and employed to provide a radar image of the field of view.

Each mixer/detector element, and therefore each of the different signals, corresponds to a particular picture element or "pixel" of the field of view. This eliminates scanning as a requirement for generation of an image, and further simplifies image signal processing.

More specifically, according to the invention, the oscillator signal is used both as a local oscillator signal and to illuminate the field of view with millimeter wave radiation. Linearly-polarized millimeter wave energy output by the source is divided into major and minor portions by a polarizing grid. The major portion is reflected from the grid toward the field of view through the lens and a preferable quarter-wave plate, becoming an illumination beam which is incident on objects in the field of view. The remainder of the oscillator signal passes through the polarizing grid and is reflected by a twist reflector back onto the polarizing grid with proper polarization, such that it is reflected towards the detector array, becoming a local oscillator signal. When the illumination beam is reflected from objects in the field of view, it again passes through the lens, the quarter wave plate, and the polarizing grid, and is incident on the array of mixer/detector elements, where it is combined with the local oscillator signal. The difference frequency signal from each of the mixer/detector elements can then by used, for example, to form an image. Specifically, generally conventional radar signal processing apparatus and circuitry can be employed to analyze the difference frequency signals to yield information concerning the range, elevation, azimuth, and velocity of objects in the field of view. Equivalent optical arrangements are also described below.

BRIEF DESCRIPTION OF THE DRAWINGS

The invention can be best understood by reference to the accompanying drawings, in which.

DESCRIPTION OF THE PREFERRED EMBODIMENTS

Figure 1:
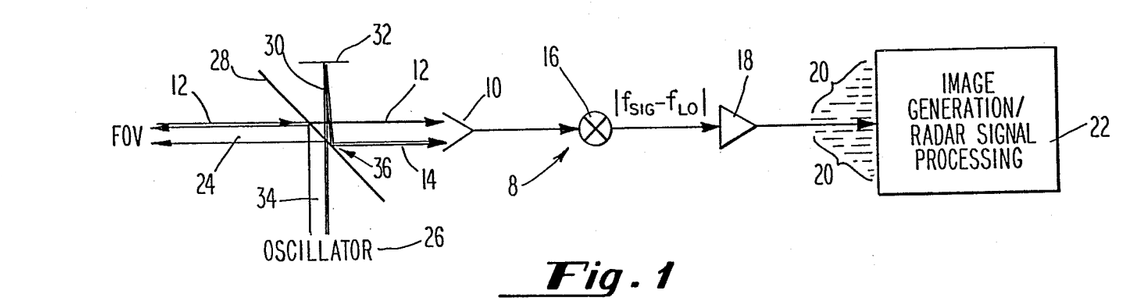
FIG. 1 shows a block diagram of one of the mixer/detector elements of the imaging array of the sensor according to the invention.

FIG. 1 is a block diagram showing the individual signal processing components employed in each of a large number of mixer/detector elements 8 in the imaging device of the invention. Energy 34 provided by a millimeter-wave oscillator 26 illuminates the field of view (FOV) as indicated at 24, and also serves as a local oscillator signal 14 which is mixed with the reflected radiation 12 to provide a lower frequency signal for convenience in signal processing.

More specifically, an antenna 10 receives a millimeter wave signal 12 consisting of radiation reflected from objects in the field of view, and a local oscillator signal 14 from a millimeter-wave source 26. As mentioned, the same source 26 is the source of time-varied millimeter wave energy 34 employed both to illuminate the field of view at 24, and as the local oscillator signal 14. The reflected energy 12 at frequency $f_{sig}$ and local oscillator signal 14 at frequency $f_{LO}$ are combined in a mixer 16. The difference signal, at frequency $|f_{sig}-f_{LO}|$, is supplied to a video or radio frequency amplifier 18. The amplified signal, together with a number of similar signals 20 from other identical elements 8 of the array, is supplied to radar signal processing circuitry 22 for generation of an image, or other purposes.

More particularly, a large number, e.g., $10^4$, of the mixer/detector elements 8 shown schematically in FIG. 1 are arranged in a detector array. The output of each element 8 is a signal the frequency of which is responsive to the difference between the frequency of the received signal 12 and the frequency of the local oscillator signal 14, and the amplitude of which is approximately proportional to the amplitude of signal 12. The signal output by each element 8 corresponds to a portion of the field of view; if an image is to be formed, each element 8 may be taken to correspond to a particular picture element (hereinafter "pixel") of the image. Accordingly, since a multiple element array is used, it need not be scanned either mechanically or electronically to generate a complete image. For example, an ordinary raster-scanned video picture can be generated simply by successively interrogating each of the imaging elements 8 along successive rows of the array of elements. A radar image can likewise be generated using conventional techniques.

Multiple element staring sensors which provide output signals directly responsive to incident visible and infrared radiation are known, e.g., so called CCD arrays. The Yngvesson et al. paper and others of similar import described above disclose suggestions for multiple element staring sensor arrays responsive to millimeter wave radiation, in which a local oscillator signal is injected into each of the elements of the array by means of a Cassegrain-telescope system. It is one object of the invention to avoid the complexity of construction of such a system.

Moreover, while it is known in imaging applications, e.g. in radar systems, to use a unitary signal source both to illuminate an object to be imaged and to provide a local oscillator signal for mixing with the reflected signal, no reference is known which suggests a means of doing this in which the local oscillator signal is also provided separately to each of the elements of a multiple-element detector array. According to the present invention, the same oscillator is used to illuminate the field of view and also to provide the local oscillator signal which is injected into each of the elements of a multiple-element detector array, again while avoiding the Cassegrain-telescope approach.

According to another important aspect of the invention, which is detailed below, the local oscillator signal 14 and the signal 12 received from the object are combined by a mixer 16 which is integrally combined with the antenna element 10 in which they are detected. Accordingly, now waveguide technology or the like is required to combine the local oscillator signal 14 with the signal 12 received from the field of view. This greatly simplifies construction of the apparatus according to the invention.

The major portion of energy 34 provided by oscillator 26 is transmitted as an illumination beam 24 onto the field of view. More particularly, the millimeter-wave energy signal 34 generated by the soruce 26, is linearly-polarized, such that it can be split into major and minor components 24 and 30 respectively by a polarizing grid 28. The major component 24 is employed as an illumination beam after reflection from the polarizing grid 28. The minor portion 30, which may include approximately 10% of the total signal energy output by the source 26 passes through the polarizing grid 28. It is then reflected from a twist reflector 32, which rotates its polarization through 90°, back onto the first reflector 28, which reflects it toward the array of mixer/detector elements 8. the minor portion 30 thus becomes the local oscillator signal 14, which is then combined with the reflected signal 12 from the field of view. Normally the transmitted illumination signal is swept in frequency as a function of time; when the reflected signal 12 is received, the local oscillator signal 14 is then at a slightly different frequency, such that the difference signal is non-zero.

Accordingly, it can be seen that the energy 34 from oscillator 26 is used both as an illumination beam 24 to illuminate the object and as the local oscillator signal 14 which is mixed with the signal 12 reflected from the field of view 12.

Figure 2:
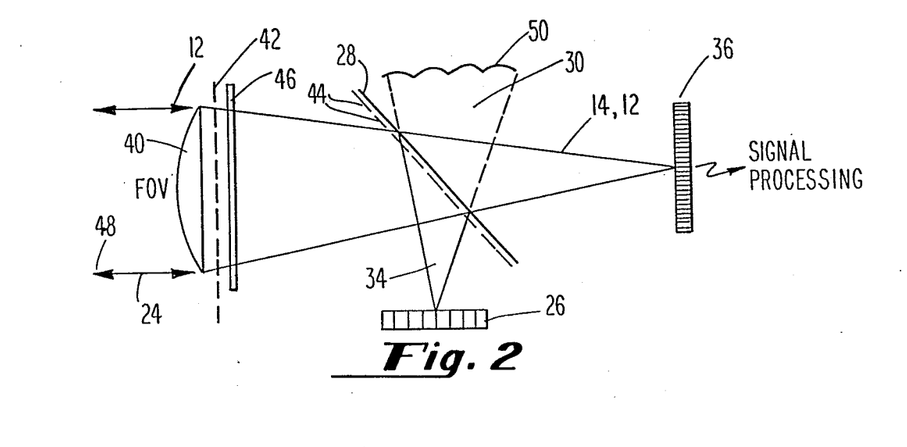
FIG. 2 shows an overall view of the optical arrangement of the imaging device of the invention.

FIG. 2 shows a possible optical arrangement of the millimeter wave signal detecting system discussed above.

Incident radiation 12 reflected from an object in the field of view passes through lens 40, filter 42, a quarter-wave plate 46 to be described subsequently, and polarizing grid 28, after which it is combined with a local oscillator signal emitted by the source of millimeter wave radiation 26. As discussed above, the linearly polarized radiation 34 emitted by the source is divided by the polarizing grid 28 into major and minor portions 24 and 30 respectively. The major portion 24, desirably including about 90% of the millimeter wave energy, passes outwardly as indicated at 48 to illuminate the field of view with millimeter wave radiation. The remaining minor portion 30 of the radiation 34 emitted by the source 26 is incident on a twist reflector 50. This device, which is described in connection with FIG. 3, has the property of rotating the polarization of the lineralry polarized incident energy by 90°. Accordingly, when the twist reflector 50 reflects the minor component 30 of the radiation back onto the polarizing grid 28, it is then reflected towards the mixer/detector array 36, forming a local oscillator signal 14 for combination with the portion of the illumination beam 24 having been reflected from the field of view.

Referring now to the individual elements of the system shown in FIG. 2, the lens 40 is generally as described in Goldsmith et al., "Gaussian Optics Lens Antennas", *Microwave Journal*, Jul. 1984. The filter 42 is generally as described in Goldsmith, "Designing Quasioptical Systems", in *The Microwave System Designers Handbook*, Fifth Edition, (1987). The filter 42 may comprise a metal plate having an array of holes drilled therein to provide a high pass filter for the millimeter wave frequencies of interest.

The polarizing grid 28 may comprise a series of parallel conductors spaced from one another by a dielectric medium. In a particularly preferred embodiment, the conducting members may be spaced parallel wires, e.g., of tungsten coated with gold, spaced in air. A less expensive alternative is to photolithograph flat conductive strips onto a dielectric substrate, e.g., Mylar (TM). In either case, the orientation of the conductors (which are indicated generally at 44 in FIG. 2),, with respect to the direction of polarization of the electric field of the millimeter wave energy 34 emitted by the source 26, determines the fraction 24 of the incident millimeter wave energy which is reflected from the grid 28; the remainder 30 passes through the grid 28.

More particularly, in a preferred embodiment, the spacing of the conductors 44 is approximately equal to or less than the wavelength of the millimeter wave radiation emitted by the source 26 divided by five. This grid 28 transmits the component of the linearly polarized electric field which is perpendicular to the direction of the conductors and reflects the portion which is parallel to their direction. If the conductors 44 are angled with respect to the direction of polarization of the radiation, a corresponding fraction passes through, and the remainder is reflected.

As indicated, a quarter-wave plate 46 is typically interposed between the polarizing grid 28 and the lens 40. The quarter-wave plate 46 is a known component which converts a linearly polarized incident wave, such as that emitted by the source 26, into a circularly polarized wave. Such a circularly polarized wave may have more desirable reflection characteristics from an object to be imaged than the linearly polarized wave; for example, a linearly polarized wave can be reflected asymmetrically depending on the particular orientation of the object, whereas a circularly polarized wave has more uniform reflection characteristics. Upon reflection of the circularly-polarized wave from the object, the quarter-wave plate 46 will convert it back to a linearly polarized wave, such that it will pass through the polarizing grid 28 without substantial attenuation. The quarter-wave plate may be manufactured from crystalline sapphire or by machining appropriate grooves into a dielectric material such as Rexolite (TM).

Figure 3:
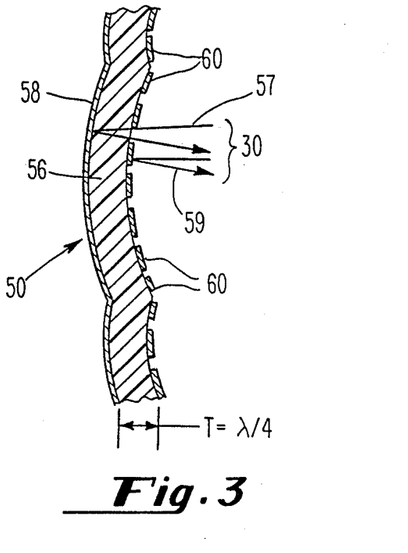
FIG. 3 shows a detailed view of the twist reflector.

As indicated schematically in FIG. 2 and as shown in more detail in FIG. 3, the twist reflector 50 comprises a number of generally concave or dish-shaped elements arranged in an array. Preferably, the number of elements in this array is equal to the number of elements in the array of millimeter wave emittes making up source 26. The shape of the concave elements of the array 50 is such as to focus the divergent beams emitted by the elements of the source 26 onto a corresponding area on the surface of the array 36 of mixer/detector elements after reflection from the polarizing grid 28.

Figure 9:
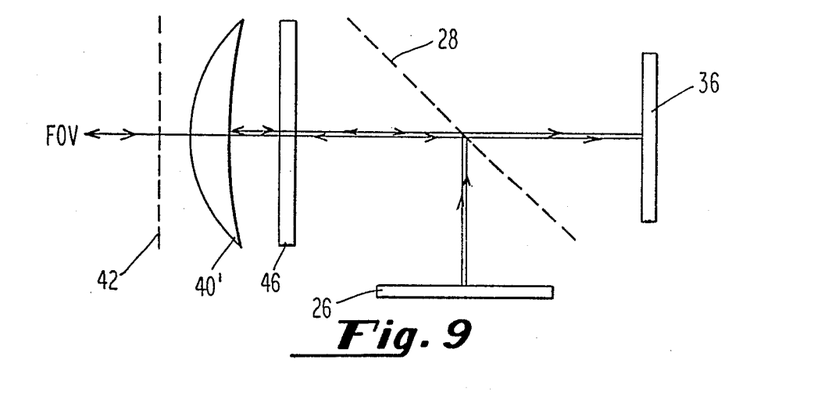
FIG. 9 shows an alternative embodiment of the optical arrangement of the system of the invention, which is comparable to that of FIG. 2.

As indicated schematically in FIG. 3, the twist reflector 50 comprises a dielectric substrate 56 coated on its rear side with a conductive layer 58, and on its front surface with a series of strips 60 of conductive material oriented at 45° to the direction of polarization of the incident wave. The electrical thickness of the dielectric 56 is one-quarter wavelength, such that the effective travel distance of the wave through the dielectric is one-half wavelength. Accordingly, when a component 57 of the incident wave 30 which is reflected from the rear conductive layer 58 is combined with a component 59 directly reflected from the strips 60, they will be 180° out of phase. This is equivalent to rotating the direction of polarization of the incident beam by 90°. Accordingly, the beam 30 incident on the twist reflector 50 (which, it will be recalled, had passed through grid 28) is effectively rotated by 90° with respect to the polarizing grid 28. When the rotated beam is again incident on grid 28, it is, therefore, reflected onto the array 36. Preferably, the concave elements of the twist reflector 50 are square and are fitted into a mosaic, in which as mentioned each element corresponds to one of the emitters of the source 26. FIG. 9 shows an alternative optical arrangement of the system of the invention in which the twist reflector is eliminated.

Figure 4:
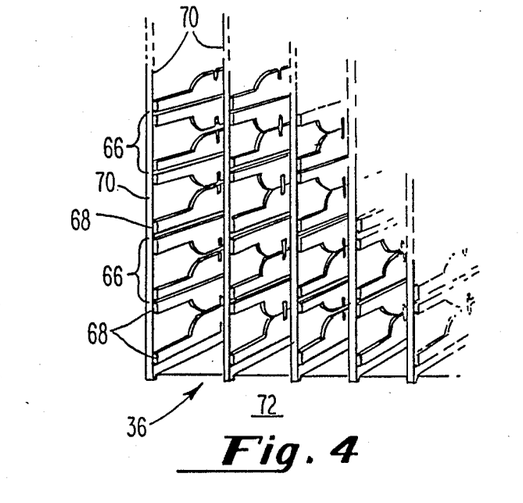
FIG. 4 shows a perspective view of the end of the focal-plane mixer/detector array which is exposed to incoming millimeter wave radiation to be used to form the image.
Figure 5:
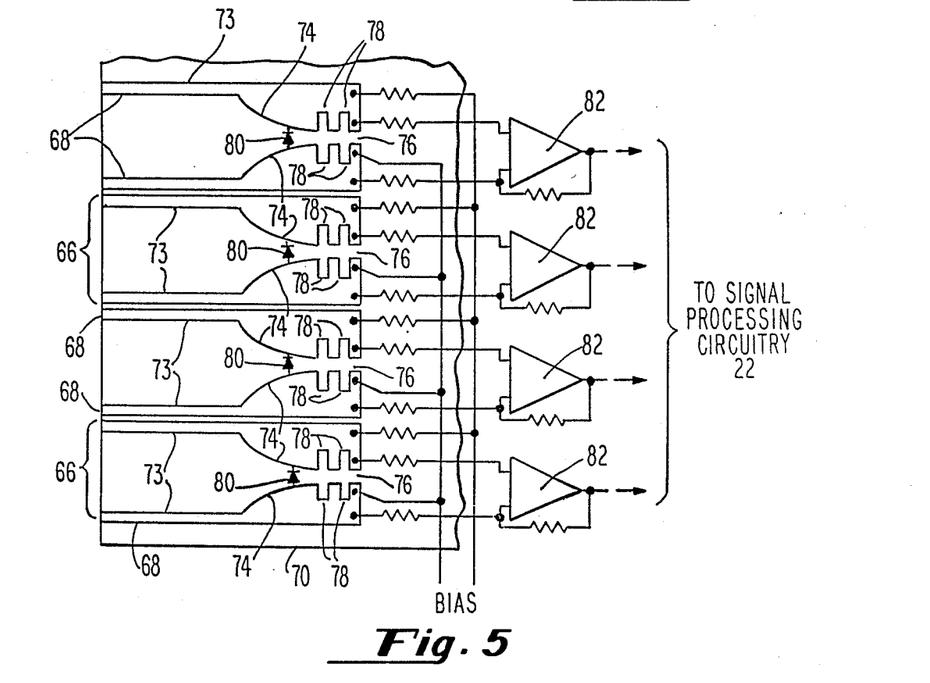
FIG. 5 shows a schematic diagram of salient portions of the circuitry connected to the mixer/detector array of the invention.

FIG. 4 shows a perspective view of a portion of the mixer/detector array 36, while FIG. 5 shows schematically a plan view of a portion of a substrate 70 on which conductors 68 making up the individual elements 66 of the array 36 of mixer/detector elements are formed. Array 36 comprises a plurality of substantially identical mixer/detector elements indicated at 66. Each element 66 comprises two conductive antenna elements 68 which may be formed directly on a non-conductive dielectric substrate such as Kapton (TM) in turn supported on alumina panels 70, which are spaced from one another by a precision spacer member 72. The outline of a preferred embodiment of the antenna elements 68 is shown in FIG. 5. As indicated, the conductive antenna elements 68 comprise parallel portions 73 which extend a distance into the array (the incident radiation being received endwise in the view shown), curved portions 74 which approach one another along an exponentially curved outline, and further portions which are separated by a slot 76 and extend for another distance.

Such an antenna is referred to in the art as an "endfire traveling wave slot antenna", as originally described by P. J. Gibson, "The Vivaldi Aerial", Proc. of the European Mic. Conf., Brighton, UK (1979), pp. 101–105. Each antenna is paired with a nonlinear circuit element 80, e.g. a diode, which provides the mixing function. In a particular embodiment of the device of the present invention, the detector 36 may be an array 100×100 of mixer/detector elements 66, resulting in 10,000 identical mixer/detector elements 66 in the overall array 36. This is adequate to provide quite reasonable resolution, for example, to produce an image of a field of view.

As indicated, each mixer/detector element 66 comprises a paiir of conductors 68, each of which has a relatively thin forward section 73 extending toward the incoming reflected and local oscillator signals, an exponential middle section 74, and a terminal slot 76 separating the two elements 68. Mixer diodes 80 are connected across the conductors 68, as indicated by FIG. 5. In a preferred embodiment, slot 76 has two additional slots 78 extending from either side thereof and orthogonal thereto. These slots 78 comprise a radio frequency choke which reflects the sum of the local oscillator and detected signals formed upon their mixing, while passing their difference.

As noted, the actual mixing of the local oscillator signal with the signal received from the field of view is performed by a nonlinear circuit element, e.g., a diode 80, which is preferably physically disposed between the two conductive elements 68 of each element, that is, directly across the slot 76. In a preferred embodiment discussed in detail below, the diode 80 is formed directly on the substrate 70 without separate connecting leads.

After the local oscillator signal and the signal from the field of view have been mixed by diodes 80 and filtered by the RF chokes formed by the slots 78, the difference frequency signal which remains is a relatively "clean" intermediate frequency signal which can be amplified by conventional operational amplifiers 82 associated with each element 66 of the array 36. The output signals from amplifiers 82 can be supplied directly to the image formation or other radar signal processing circuitry 22 as indicated above.

Figure 6:
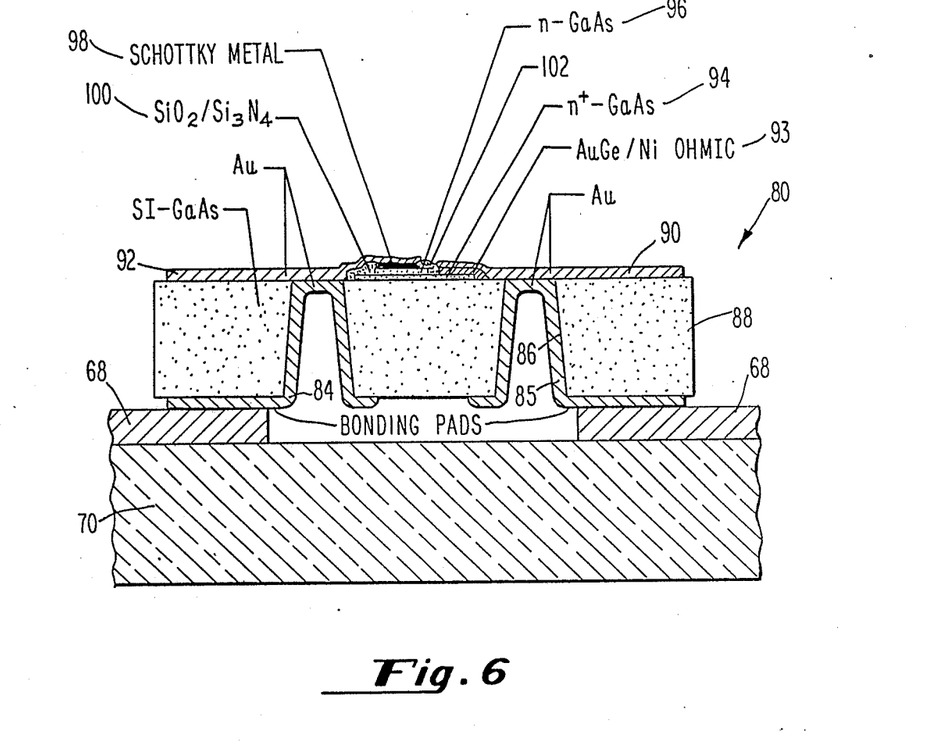
FIG. 6 shows a cross-sectional view of a Schottky mixer diode employed in each of the individual mixer/detector elements of the imaging array.

FIG. 6 shows a cross-sectional view through one of the mixer diodes 80 which are preferably formed directly on the substrate 70 on which are formed the conductors 68 making up each of the antenna elements 66. In this embodiment, the diode 80 comprises bonding pads 84 and 85 which may be formed of gold and extend through vias (that is, through-holes) 86 in a semi-insulating (SI) GaAs substrate 88. The gold bonding pads 84 and 85 contact further additional gold electrodes 90 and 92 formed on the opposite side of the substrate 88. Electrodes 90 and 92 overlay the actual diode structure. The diode structure comprises a first layer 94 of n+-GaAs which is in contact with the semi-insulating GaAs substrate 88. Over this is formed an n-GaAs layer 96. Atop this layer 96 is provided a layer 98 of Schottky metal, which in a preferred embodiment may be Ti/Pt/Au. The Schottky metal layer 98 is directly in contact with electrode 92 and is thus in contact with bonding pad 84. The n+-GaAs layer 94 is in contact with the other electrode 90 and thus the other bonding pad 85 via an ohmic layer 93 of AuGe/Ni. Finally, an insulating/passivating $SiO_2/Si_3N_4$ material fills spaces 100 and 102 between the various layers. In a particularly preferred embodiment, the spaces 100 and 102 may also include an air gap between the electrode 92 and the GaAs layers 93 and 94, i.e., around the Schottky metal 98, with or without the $SiO_2/Si_3N_4$ material. This has the beneficial effect of reducing the parasitic capacitance of the mixer diode 80.

It will be appreciated that the structure described lends itself to ready fabrication directly on the substrate 70 carrying conductors 68 of the mixer/detector assembly, particularly as compared with a process involving assembly of conventional descrete diode elements, e.g., vertically-oriented or planar beam-lead diodes to the electrodes.

Ultimately, and subject to further developments in semiconductor materials and fabrication techniques, it may be possible to integrate the function of amplifiers 82 with that of mixer/detector diodes 80. This would require the development of amplifiers capable of operation at millimeter-wave frequencies. It is envisioned that such devices could perform the mixing and amplification functions within a single semiconductive element. This would be highly desirable, as it would presumably substantially increase the signal-to-noise ratio of each mixer/detector element 66. The claims of this application are intended to include such improved devices, when they become available.

Figure 7:
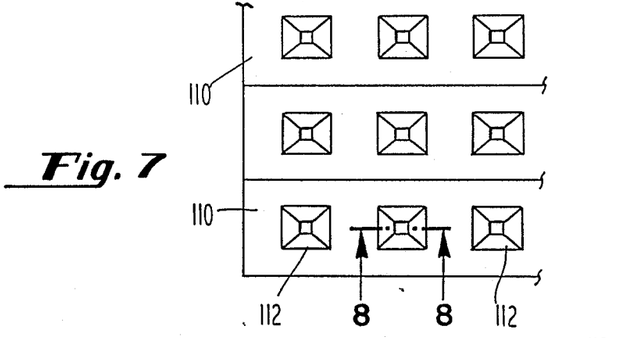
FIG. 7 shows an overall view of a portion of the aperture-plane source array used to provide the millimeter-wave signal.

FIG. 7 shows a partial end-on view of the emitter array 26, which emits the signal which is mixed with the received signal and which illumiinates the field of view. As indicated, the array 26 is made up of a number of substantially identical elements 112. Typically the emitter array 26 may comprise 625 identical elements 112 in a 25×25 arrangment. Each of the individual elements 112 of the array 26, the structure of which is discussed below in connection with FIG. 8, comprises an indium phosphide (InP) Gunn diode or other oscillator coupled to a radiating horn. Preferably the array 26 may be made up of a number of sub-arrays 110 which are integrally fabricated for convenience in manufacturing and assembly.

Figure 8:
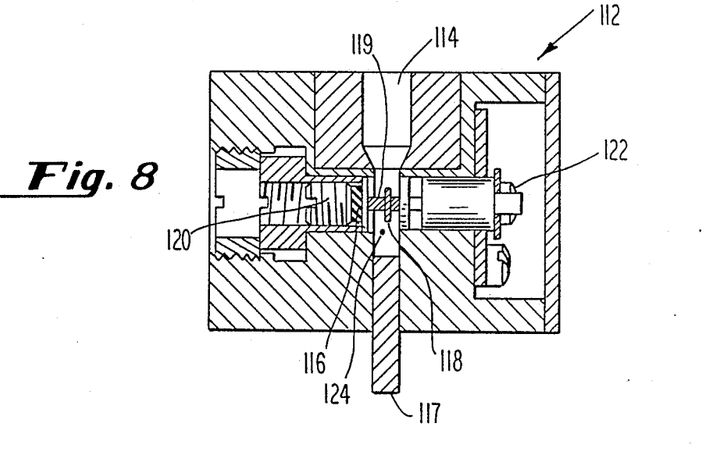
FIG. 8 shows a cross-sectional view of one of the elements of the source array taken along line 8—8 of FIG. 7.

FIG. 8 is a cross section taken along line 8—8 of FIG. 7, and shows a detail of one of the elements 112 in the source array 26. Each element comprises a linear oscialator cavity 114 including an integral radiator horn output section. The active element is a Gunn diode element 116, the construction of which is generally conventional. The cavity comprises a radial disc resonator 118 located along a coaxial RF choke structure 119 which supplies DC bias to the Gunn diode element 116. A fixed backshort 117 is used to optimize the performance of the basic oscillator. This type of element is referred to in the art as a "waveguide cavity resonator" which is driven by the Gunn diode.

As can be observed from FIG. 8, the diode element 116 is compressed by a threaded member 120 into the resonator structure 119. The center frequency of the Gunn diode oscillator is determined by the diameter of the resonator disc 118; minor adjustments to its frequency can by provided by mechanical tuning rod 124. The bias voltage of the InP Gunn diode can be varied in order to transmit millimeter wave energy at frequencies varying by approximately ±300 MHz at 65 GHz. As discussed below, in the preferred embodiment, a "sawtooth" transmitted signal is preferred; to produce this the bias voltage is accordingly varied in a sawtooth fashion. If needed, additonal tuning can be provided by introducing a dielectric material such as sapphire into the vicinity of the resonant disc 118. Typical continuous-wave radiative power levels for the device are 100 mw/emitter at 95 GHz.

Selection of an operating wavelength and frequency for the system according to the invention involves several design tradeoffs. The characteristic atmospheric absorption dictates operation in either the 1.2 mm, 2 mm or 3 mm wavelength band. Aperture size is reduced for smaller wavelengths, encouraging miniaturization of antenna components, but mixer performance decreases at the higher frequencies concomitant with smaller wavelengths. At present, the optimum frequency is considered to be 94 GHz (3 mm wavelength) or 140 GHz (2 mm), but this could change as better components (principally mixers) become availabe. At these frequencies, atmospheric attenuation, including that due to water vapor, need only be considered in connection with very long range imaging systems.

FIG. 9 shows an alternative optical arrangement of the millimeter-wave radar system of the present invention. This figure is comparable to FIG. 2, in that it shows the overall arrangement of the device. Again a transmitting array 26 located in the focal plane of the lens transmits linearly-polarized millimeter-wave energy onto a polarizing grid 28 which directs it towards a field of view (FOV). The transmitted energy travels through a quarter wave plate 46 which transforms it from a linearly polarized beam to a circularly polarized beam. The circularly polarized beam is then incident on lens 40' which in this case is a meniscus lens, that is, a concave-convex lens. The meniscus lens may be formed of materials such as Rexolite (TM) or Teflon (TM). See the Goldsmith and Goldsmith et al. articles discussed above. A portion of the incident radiation is reflected from the lens 40' and becomes the local oscillator signal. As is well known to those of skill in the art, the precise amount of the radiation reflected can be controlled as needed by the employment of known anti-reflective coatings on the surface of lens 40'. The remainder of the energy incident on lens 40' is transmitted therethrough to become the illumination beam. The quarter-wave plate 46 transforms the circularly-polarized reflected local oscillator portion of the beam back into a linearly-polarized beam, but at a polarization of 90° to the original energy, so that is passes through the polarizing grid 28 and is incident on the mixer/detector array 36. A high pass filter may again be employed as indicated at 42.

Accordingly, in this embodiment of the invention, the twist reflector 50 of FIG. 2 is replaced by the meniscus lens 40', which has the property of passing a major portion of the energy to become the beam which illuminates the field of view while reflecting a minor portion of the energy to become the local oscillator signal which is then incident on array 36.

In this embodiment of the invention, the polarizing grid 28 need not be aligned with respect to the polarization of the energy from the source array 26 in order to divide the energy into local oscillator and illumination portions; this function is provided by the intrisic characteristics of the mensicus lens 40', optionally in conjunction with an anti-reflective coating as discussed above. Both the local oscillator portion of the incident energy from the source and the energy reflected from objects in the field of view pass twice through the quarter-wave plate. This provides a 90° change in polarization direction, so that the energy passes through the polarizing grid 28 and is incident on the mixer/detector array 36. The advantage of this design is that depending on various parameters it may be somewhat simpler to fabricate the meniscus lens than the twist reflector.

Other optical arrangements are possible. For example, a Faraday rotator can be substituted for the quarter wave plate in the embodiment of FIG. 9. The Faraday rotator is described in the Goldsmith article, "Designing Quasioptical Systems", referred to above. The Faraday rotator provides 45° rotation of the polarization beam such that both the minor local oscillator portion of the emitted energy and the energy reflected from objects in the field of view are rotated through 90° by the Faraday rotator. In this case, the illumination beam would be linearly polarized (rather then circularly polarized, as if the quarter-wave plate were used). This may be desirable, depending on the reflection characteristics of the objects to be imaged.

A further possibility would be to provide a Faraday rotator and mirror combination in place of the twist reflector described in connection with FIG. 2. Again this combination would have the function of reflecting the local oscillator portion of the beam and rotating its polarization through 90°, such that on its second incidence on the polarizing grid 28, it would be reflected therefrom and become a local oscillator signal for mixing with the received signal from the field of view in the array of mixer/detector elements 36.

It will be appreciated that there has been described a millimeter wave signal detection device which comprises an array of mixer/detector elements, each adapted to provide an output intermediate frequency signal responsive to a local oscillator signal mixed with radiation reflected from a portion of a field of view. It will be appreciated that the mixer/detector array according to the invention is a "staring" array, that is, one which does not require mechanical or electronic scanning in order to provide an image of an entire field of view.

More specifically, at all times, the output signal from each of the mixer/detector elements of the array 36 corresponds to a portion of the device's field of view. For this reason, according to an important aspect of the present invention, it is not necessary that a detecting device be mechanically scanned with respect to the field of view, or that the transmitter by scanned, either by providing a phased-array of emitters or otherwise, in order that a complete image can be generated. Instead, the transmitting elements according to the invention illuminate the field of view substantially continually and the detectors each respond to reflection of the transmitted signal from a portion of the field of view. This greatly simplifies generation of an image responsive to reflection of the radar signal from objects in the field of view, and determining their distance, elevation, and azimuth with respect to the system of the invention and measuring their relative velocity.

According to the invention, the direction of an object from which radiation has been reflected can be determined directly responsive to identification of the one or more detector elements which detected the reflected radiation. That is, the postion of the detecting element in the array which detects the reflected signal indicates directly the relative position of the reflecting object with respect to the array.

Measurement of the distance of the reflecting object from the array, and of its relative velocity with respect to the array, can be determined using conventional radar signal processing techniques, after the signal has been generated according to the invention. For example, at pages 81-84 of Skolnik op. cit., (which is incorporated by reference herein) there is provided a brief and succinct but complete description of the way in which distance and velocity information can be derived from reflection of a simple sawtooth varying transmitted signal. Essentially, the distance of the reflecting object from the array is determined simply by measuring the transit time taken for the signal to reach the object, be reflected therefrom and be detected at the array, and dividing this time by twice the speed of light $c$. The difference in frequency between the local oscillator signal being transmitted at a particular time and the frequency of the detected signal is directly responsive to the travel time of the reflected signal. Hence the travel time of the signal can be determined proportional to the rate of change of frequency of the transmitted signal.

Derivation of the relative velocity of the object with respect to the array can also readily be derived from relative frequency information contained in the reflected signal, as indicated by Skolnik. As is well understood, the relative frequency of the signal reflected from a moving object varies with respect to a stationary object at the same azimuth and elevation according to the well known Doppler effect. Relative motion of the reflecting object toward the array increases the apparent frequency shift, and motion of the object away from the array decreases the frequency shift. This effect can be distinguished from frequency shift in the reflected signal with respect to the transmitted signal by employment of the sawtooth transmitted signal, and comparison of frequency shift in successive portions thereof. As shown in Skolnik, op. cit., FIG. 3.12, this fact can be used in a manner well understood by those of skill in the art to monitor the velocity of objects within the field of view of the system of the invention.

Other conventional radar signal processing techniques are also within the scope of the invention, where not specifically described.

Any of a wide variety of image processing and image enhancement and analysis techinques may be combined with the radar signal generation and processing techniques according to the invention, such as convolution, false coloration, and identification of individual objects in the image both by comparison to known shapes and otherwise. Note in this connection that the fact that the image signal is provided pixel-by-pixel by the staring array of the invention makes it particularly amenable to many image processing techniques, especially those involving Fourier transformation. Such teachings, which are now or later fall within the skill of the art, are considered to be within the scope of the invention if not excluded by the following claims.

Therefore, while several preferred embodiments of the invention have been described in detail, these are to be considered exemplary only and not as limitations on the scope of the invention, which is defined only by the appended claims.

We claim:

1. A millimeter wave object detection and location system, comprising:
   an array of oscillators for emitting a beam of millimeter wave radiation the frequency of which varies according to a predetermined function of time;
   means for directing said radiation onto a detector array as a local oscillator signal, and for transmitting said radiation into a field of view;
   a detector array for detecting said emitted time-varying radiation having been reflected from one or more objects in the field of view, wherein said detector array comprises a two-dimensional array of detectors, each of said detectors being capable of forming a signal responsive to mixing of millimeter-wave radiation reflected from an object in the corresponding portion of said field of view with said local oscillator signal;
   wherein said array of oscillators each direct radiation into a particular portion of said field of view and onto a corresponding portion of said detector array; and
   means for processing the signals formed by each of said detectors in order to detect the presence of any said objects in the field of view and to indicate their locations.

2. The system of claim 1 wherein said means for processing determines the distance of any said objects in the field of view from said means for detecting by determining the interval of time elapsed between the emission of radiation reflected from the object and its detection by the means for detecting.

3. The system of claim 2 wherein said means for processing is adapted to further determine the velocity of said objects with respect to the array of detectors by measurement of relative shift in the frequency of radiation reflected from said objects.

4. The system of claim 1, further comprising means for dividing the beam emitted by said oscillator means into first and second components, said first component being directed toward the field of view as an illumination beam, and said second component being directed onto said array of detectors as a local oscillator signal for mixing with radiation reflected from said objects in the field of view.

5. The system of claim 1, wherein each of the detectors of said array comprises a mixer/detector element for detecting radiation reflected from objects in a corresponding portion of the field of view, and for mixing the detected radiation with the local oscillator signal.

6. The system of claim 5 wherein said mixer/detector elements of said array each comprise an endfire traveling wave slot antenna and a nonlinear circuit element.

7. The system of claim 6 wherein said nonlinear circuit elements are Schottky barrier diodes.

8. The system of claim 7 wherein said antennas each comprise two planar conductors spaced from one another on a dielectric substrate, defining a slot between said conductors generally aligned along the optical axis between said field of view and said detector.

9. The system of claim 8 wherein each of said mixer/detector elements further comprises an RF choke.

10. The system of claim 9 wherein said RF choke comprises one or more slots in each of said planar conductors extending orthogonally to said slot between said planar conductors.

11. The system of claim 8 wherein the diode of each element is formed on a planar substrate and the active semiconductor member of said diode is contacted by conductor members, and wherein the active member of each diode is connected to said planar conductors by direct bonding of said conductor members to said planar conductors.

12. The system of claim 4, wherein said millimeter wave energy emitted by said source is linearly polarized and said means for dividing comprises a polarizing grid.

13. The system of claim 12, further comprising means for rotating the polarization of one of said illumination beams and said local oscillator signal.

14. The system of claim 13 wherein the polarization of said local oscillator signal is rotated by said means for rotation.

15. The system of claim 14 wherein said means for rotating is a twist reflector.

16. The system of claim 14, wherein said polarizing grid is employed to direct the illumination beam onto the field of view and to direct the rotated local oscillator signal onto the mixer/detector array.

17. The system of claim 16, wherein said twist reflector comprises at least one generally planar member comprising a dielectric substrate, a series of spaced parallel conductors on one side of said substrate, and a layer of conductive material on the other side of said substrate.

18. The system of claim 17, wherein said twist reflector is a mosaic assembly of said generally planar members.

19. The system of claim 18 wherein the number of said generally planar members making up said mosaic is equal to the number of oscillators in said array of oscillators.

20. The system of claim 19 wherein each of the members of said mosaic is concave and is aligned with one of said oscillators in said array so as to direct the energy emitted thereby.

21. The system of claim 20 wherien each of said oscillators of said source array comprises a waveguide cavity in combination with a Gunn diode or other oscillator.

22. The system of claim 12 wherein the means for dividing provides the major portion of said beam as said illumination beam.

23. The system of claim 12 wherein said polarizing grid comprises a number of parallel conductive members printed on and spaced from one another on a dielectric substrate.

24. The system of claim 1, wherein said millimeter wave energy emitted by said source is linearly polarized, and further comprising means for converting the linearly-polarized illumination beam into a circularly-polarized beam prior to direction thereof onto the field of view, and for converting the reflected millimeter wave energy back into a linearly polarized beam.

25. The system of claim 24 wherein said means for converting is a quarter-wave plate.

26. The system of claim 1, wherein said millimeter wave energy emitted by said source is linearly polarized, and further comprising polarization-senstive means for directing such energy along a non-linear optical path between said source and said field of view, and means in said path for rotating the polarization of energy reflected from objects in said field of view such that said reflected energy passes through said polarization-sensitive means and is incident on said array of detectors.

27. The system of claim 26 wherein said means for rotating is a Faraday rotator.

28. The system of claim 1 further comprising high-pass filter means located such that said illumination beam and said energy from said field of view pass therethrough.

29. The system of claim 1 wherein said array of oscillators comprises an array of Gunn diodes.

30. The system of claim 29 wherein the number of said diodes in said array of oscillators is substantially less than the number of said mixer/detector elements in said array.

31. The system of claim 4 wherein said means for dividing is a meniscus lens disposed in the optical path between said oscillator means and said field of view, and wherein said meniscus lens divides said beam emitted by said oscillator means into said first and second components.

32. The system of claim 31 wherein said beam incident on said meniscus lens is linearly polarized and is reflected from said oscillator means onto said meniscus lens by polarization-sensitive means.

33. The system of claim 32 wherein said polarization-sensitive means is a polarizing grid means.

34. The system of claim 33 further comprising means for altering the polarization of energy reflected from objects in the field of view such that said reflected energy is essentially transmitted through said polarizing grid means.

35. A millimeter wave object detection, location and velocity indicating system, comprising:
means for emitting a beam of millimeter-wave radiation, the frequency of which is varied in a predetermined manner as function of time;
means for directing said beam onto a field of view;
an array of detectors for detecting radiation reflected from objects in said field of view;
an array of sources of millimeter wave radiation, arranged to evenly illuminate said array of detectors with a local oscillator signal;
said detectors each further comprising means for mixing said local oscillator signal with radiation reflected from objects in the field of view and means for providing an output signal responsive to said means for mixing; and
signal processing means, for:
determining the direction of said objects with respect to said array of detectors, responsive to identification of the ones of said detectors providing said output signals;
determining the distance of said objects from said array of detectors, responsive to measurement of the time elapsed between emission of the reflected radiation and its detection; and
determining the velocity of said objects by determining the relative frequency shift of the reflected radiation.

36. The system of claim 35, wherein said means for emitting varies said emitted signal in a sawtooth pattern as a function of time, and wherein said signal processing means determines the distance and velocity of said objects with respect to said array by analysis of the relative frequency of the reflected signal with respect to the emitted signal.

37. The system of claim 35, wherein said array of sources of said local oscillator signal also emits said beam of millimeter wave radiation.

38. The system of claim 37, wherein each of the elements of said array of detectors comprises a mixer/detector element for mixing the reflected signal with the reflected signal to yield said difference signal.

39. The system of claim 38 wherein said mixer/detector elements each comprise a non-linear circuit element connected across two conductors of a millimeter wave antenna.

40. The system of claim 39 wherein said non-linear circuit elements are Schottky barrier diodes.

41. The system of claim 40 wherein said antennas each comprise two planar conductors spaced from one another on a dielectric substrate, defining a slot between said conductors generally aligned along said optical path.

42. The system of claim 41 wherein each of said mixer/detector elements further comprises an RF choke.

43. The system of claim 42 wherein said RF choke comprises one or more slots in each of said planar conductors extending orthogonally to said slot between said planar conductors.

44. The system of claim 43 wherein the diode of each element is formed on a substrate and comprises an active semiconductor element contacted by metallic conductors, and wherein said metallic conductors are connected directly to said planar conductors of said antennas.

45. The system of claim 35 wherein said beam of millimeter wave energy emitted by said array of sources is linearly polarized.

46. The system of claim 45 wherein said array of sources directs said energy toward an optical path extending between said field of view and said array of detectors, and said system further comprises a polarizing grid in said optical path for dividing said emitted beam into local oscillator and illumination portions, and for directing said local oscillator portion onto said array and directing said illumination portion onto the field of view.

47. The system of claim 46 wherein said polarizing grid comprises a plurality of parallel conductive elements spaced from one another by a dielectric.

48. The system of claim 35 wherein said array of sources is an array of waveguide cavities driven by oscillator means.

49. The system of claim 48 wherein said oscillator means comprise Gunn diodes.

50. The system of claim 48 wherein the number of said oscillators in said array is substantially less than the number of elements in said array of detectors.

51. Method for generating a millimeter-wave image responsive to objects in a field of view, comprising the steps of:
employing an array of oscillator sources to generate a beam of millimeter-wave energy, the frequency of which is varied according to a predetermined function of time,
transmitting a first minor portion of said beam toward an array of mixer/detector elements, such that individual ones of said oscillator sources illuminate corresponding portions of said array,
directing a second major portion of said beam onto the field of view, such that individual ones of said oscillator sources illuminate corresponding portions of the field of view,
focusing energy from said major portion of said beam reflected from objects in the field of view onto the array,
mixing the reflected energy with the minor portion of the beam individually in the elements of said array,
detecting difference-frequency signals resulting from said mixing step with respect to each of the elements of said array,
analyzing said detected difference frequency signals to determine the relative direction and distance of said objects with respect to said array of elements, and generating an image of said objects responsive to said analyzing step.

52. The method of claim 51 comprising the further step of analyzing said detected difference frequency signals to determine the velocity of said objects with respect to said array.

53. The method of claim 51, wherein said step of analyzing the detected signals to determine the relative direction of the objects is performed responsive to the relative location in the array of the elements of the array detecting reflection of the energy from the objects.

54. The method of claim 51, wherein said step of analyzing the detected signals to determine the distance of said objects is performed by measurement of the time of travel of said major portion of said beam between said objects and said array.

55. The method of claim 54 wherein said step of measurement of the time is performed by noting the variation with respect to time of the frequency of the detected signal after reflection from the objects.

56. The method of claim 52, wherein the frequency of said transmitted beam is varied in a sawtooth fashion over time, and said step of analyzing the detected signal to determine the velocity of said objects is performed by analysis of differences in the frequency of the reflected signal with respect to the variation of the frequency of the transmitted signal.

57. The method of claim 53, wherein said generated beam of energy is linearly polarized, and comprising the further step of dividing said beam into said major and minor portions using polarization-selective means.

58. The method of claim 57 comprising the additional step of rotating the minor portion of the beam through 90° and using said polarization-selective means to reflect the rotated minor portion of the beam toward said mixer/detector array.

59. The method of claim 57 wherein said polarization-selective means is a polarizing grid.

60. The method of claim 59 wherein said rotation is performed by a Faraday rotator.

61. The method of claim 57 comprising the additional steps of converting the major portion of the linearly-polarized beam into circularly polarized radiation prior to directing said major portion toward the field of view, and converting the reflected energy back to linearly polarized radiation prior to directing the reflected beam onto the mixer/detector elements.

62. The method of claim 61 wherein said conversion is performed by a quarter-wave plate.

63. The method of claim 58 wherein said step of dividing is performed by a meniscus lens.

64. The method of claim 51 wherein said beam is divided into major and minor portions by a meniscus lens.

* * * * *

UNITED STATES PATENT AND TRADEMARK OFFICE
CERTIFICATE OF CORRECTION

PATENT NO. : 4,901,084
DATED : February 13, 1990
INVENTOR(S) : Hugeunin, et al.

It is certified that error appears in the above-identified patent and that said Letters Patent is hereby corrected as shown below:

Title page item (75):

In the section entitled "Inventors", replace "Richard G." with --G. Richard--.

In "Other Publications" (cover page, left column, bottom line of column) replace "946HZ" with --94GHz--.

In "Other Publications" (cover page, right column, line 1 of column), replace "Tuperev Slot Antennu" with --Tapered Slot Antenna--.

In "Other Publications" (cover page, right column, line 6 of column), replace "946HZ" with 94GHz".

Column 1, line 27, after "adverse" and before "such", replace "enviornments" with --environments--.

Column 1, line 54, after "in" and before "from", replace "pahse with --phase--.

Column 2, line 12, after "of" and before "field", replace "an" with --a--.

Column 2, line 19, after "Schottky-" and before "diode", replace "carrier" with --barrier--.

Column 2, line 39, after "corresponds" and before "one", insert --to--.

Column 2, line 58, after "respect" and before "uniformity", replace "of" with --to--.

Column 2, line 60, after "such" and before "arrangements", replace "Cassegrain-telephone" with --Cassegrain-telescope--.

Column 3, line 61, after "multiple" and before "mixer/detector", replace "lement" with --element--.

Column 5, line 65, after "e.g.," and before "CCD", replace "so called" with --so-called--.

Column 6, line 24, after "Accordingly" and before "waveguide", replace "now" with --no--.

Column 6, line 32, after "the" and before "26", replace "soruce" with --source--.

Column 6, line 55, after "view" and before ".", replace "12" with --24--.

Column 7, lines 6-7, after "the" on line 6 and before "polarized" on line 7, replace "lineraly" with --linearly--.

Column 8, line 6, after "wave" and before "making", replace "emittes" with --emitters--.

Column 9, line 2, after "a" and before "of", replace "paiir" with --pair--.

Column 10, lines 30-31, after "linear" on line 30 and before "cavity" on line 31, replace "osciallator" with --oscillator--.

Column 10, line 49, after "at" and before "GHz", replace "65" with --95--.

Column 11, line 1, after "become" and before "At", replace "availabe" with --available--.

Column 11, line 46, after "the" and before "charac-", replace "intrisic" with --intrinsic--.

Column 12, line 31, after "transmitter" and before "scanned", replace "by" with --be--.

UNITED STATES PATENT AND TRADEMARK OFFICE
CERTIFICATE OF CORRECTION

PATENT NO. : 4,901,084

DATED : February 13, 1990

INVENTOR(S) : Hugeunin, et al.

Page 2 of 2

It is certified that error appears in the above-identified patent and that said Letters Patent is hereby corrected as shown below:

Column 12, line 65, after "by" and before "the", replace "twice" with --two over--.

Column 15, line 39, (line 3 of Claim 26), after "polarization-" and before end of line, replace "senstive" with --sensitive--.

Signed and Sealed this

Fifteenth Day of September, 1992

Attest:

DOUGLAS B. COMER

Attesting Officer

Acting Commissioner of Patents and Trademarks